United States Patent
Launay et al.

(10) Patent No.: US 7,895,014 B2
(45) Date of Patent: Feb. 22, 2011

(54) METHOD FOR IMPROVING THE LOCALISATION OF A TARGET IN REGARD OF A SENSOR

(75) Inventors: Claude Launay, Champigny (FR);
Joaquim Da Silva, Sennely (FR);
Florent Voisin, Guillerval (FR);
Tomoaki Hirai, Kanagawa-ken (JP);
Takanori Ninomiya, Kanagawa-Ken (JP); Shunji Maeda, Kanagawa-ken (JP)

(73) Assignee: Hitachi Computer Products (Europe) S.A.S., Olivit (FR)

( * ) Notice: Subject to any disclaimer, the term of this patent is extended or adjusted under 35 U.S.C. 154(b) by 0 days.

(21) Appl. No.: 11/803,860

(22) Filed: May 15, 2007

(65) Prior Publication Data

US 2008/0033691 A1 Feb. 7, 2008

(30) Foreign Application Priority Data

May 17, 2006 (EP) .................................. 06290806

(51) Int. Cl.
*G01B 3/00* (2006.01)

(52) U.S. Cl. ........................ 702/158; 702/150; 702/155; 702/159

(58) Field of Classification Search ............... 702/41, 702/142, 149, 158, 182, 183; 340/667; 280/735; 701/45; 180/271
See application file for complete search history.

(56) References Cited

U.S. PATENT DOCUMENTS

| 6,683,534 | B2 * | 1/2004 | Patterson et al. ............. 340/436 |
| 6,816,077 | B1 * | 11/2004 | Shieh et al. ................. 340/602 |
| 7,271,730 | B2 * | 9/2007 | Kimura et al. ............... 340/667 |
| 2004/0118619 | A1 | 6/2004 | Gray et al. |
| 2005/0253712 | A1 | 11/2005 | Kimura et al. |

FOREIGN PATENT DOCUMENTS

EP 1308350 5/2003

* cited by examiner

*Primary Examiner*—Michael P Nghiem
*Assistant Examiner*—Felix E Suarez
(74) *Attorney, Agent, or Firm*—Blakely, Sokoloff, Taylor & Zafman LLP

(57) ABSTRACT

The present invention relates to a method to locate a target in regard of a sensor, comprising the steps of collecting the outputs of a capacitive sensor comprising a plurality of electrodes and combining said outputs so as to obtain a signal representative of the distance separating said target from the sensor.

31 Claims, 6 Drawing Sheets

FIG_1
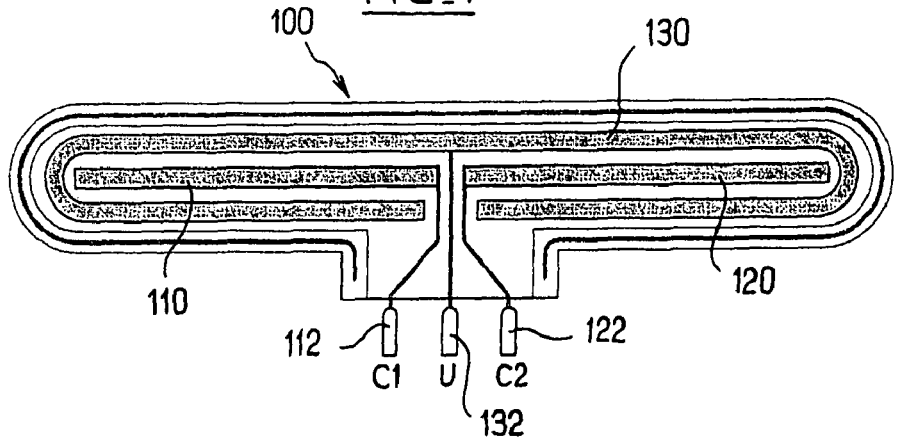
FIG_2
|  | 110 | 120 | 130 |
|---|---|---|---|
| C1 | Vf | Vf | G |
| CU1 | Vf | Vf | Vf |
| C2 | Vf | Vf | G |
| CU2 | Vf | Vf | Vf |
FIG_3
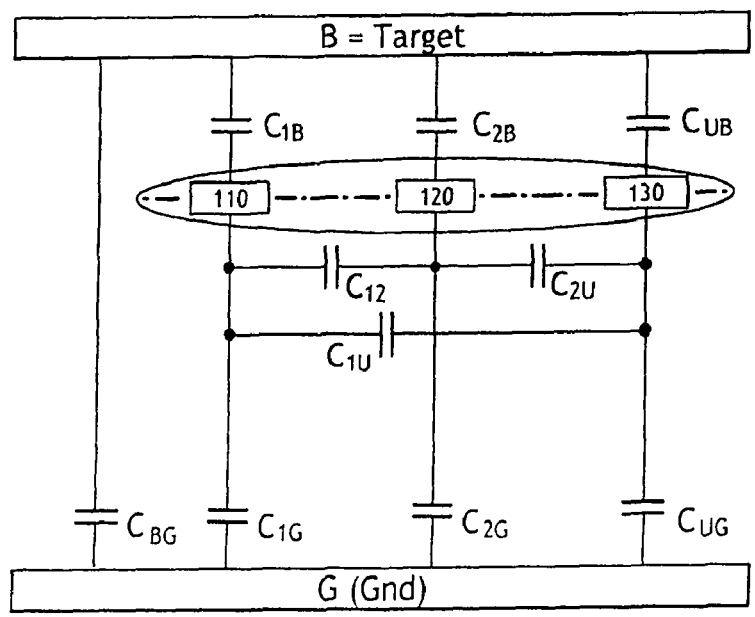

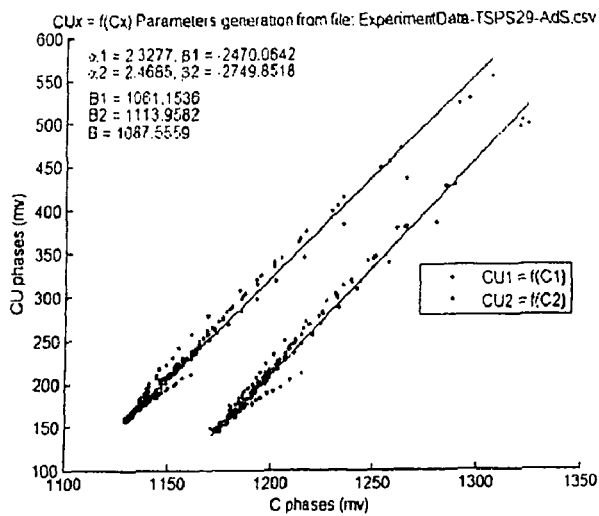
FIG_7a
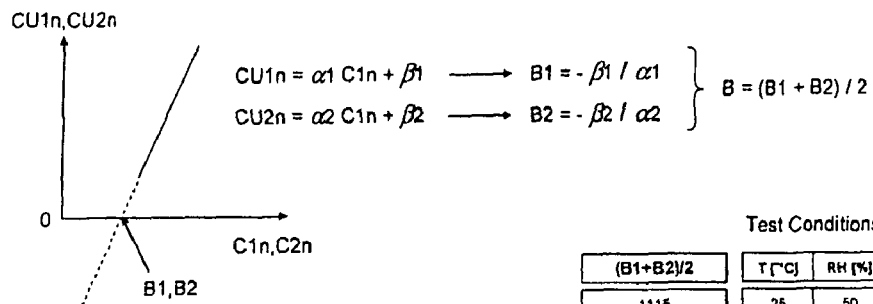
FIG_7b
FIG_7c
FIG_7

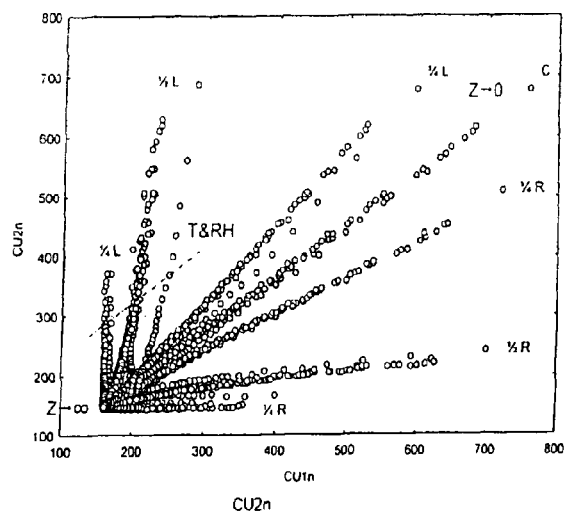
FIG.8a
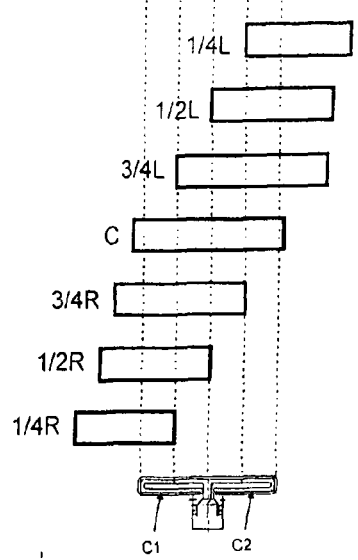
FIG.8b
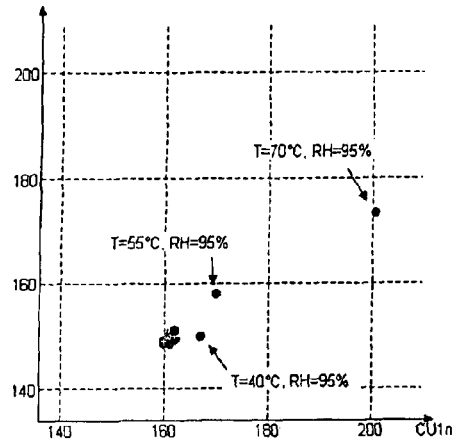
FIG.9a
FIG.9b
| | Temp | Hygro | B1+B2/2 | CU1n | | | | CU2n | | | |
|---|---|---|---|---|---|---|---|---|---|---|---|
| | | | | Ave | Max | Min | delta [%] | Ave | Max | Min | delta [%] |
| ● | 25 | 50 | 1115 | 160 | 163 | 157 | 3.7 | 149 | 150 | 146 | 2.7 |
| ● | 25 | 70 | 1123 | 161 | 162 | 158 | 2.5 | 149 | 151 | 146 | 3.4 |
| ● | 25 | 95 | 1162 | 162 | 164 | 160 | 2.5 | 149 | 152 | 146 | 4.0 |
| ● | 40 | 50 | 1142 | 160 | 161 | 157 | 2.5 | 148 | 150 | 144 | 4.1 |
| ● | 40 | 70 | 1163 | 161 | 162 | 159 | 1.9 | 148 | 150 | 144 | 4.1 |
| ● | 40 | 95 | 1288 | 167 | 169 | 165 | 2.4 | 149 | 151 | 145 | 4.0 |
| ● | 55 | 50 | 1150 | 161 | 163 | 159 | 2.5 | 150 | 151 | 147 | 2.7 |
| ● | 55 | 70 | 1166 | 162 | 163 | 158 | 3.1 | 149 | 151 | 146 | 3.4 |
| ● | 55 | 95 | 1386 | 170 | 173 | 168 | 2.9 | 158 | 160 | 154 | 3.8 |
| ● | 70 | 50 | 1204 | 162 | 165 | 160 | 3.1 | 150 | 152 | 147 | 3.3 |
| ● | 70 | 70 | 1239 | 162 | 165 | 160 | 3.1 | 151 | 153 | 148 | 3.3 |
| ● | 70 | 95 | 1537 | 201 | 204 | 198 | 3.0 | 173 | 176 | 168 | 4.6 |

FIG_10
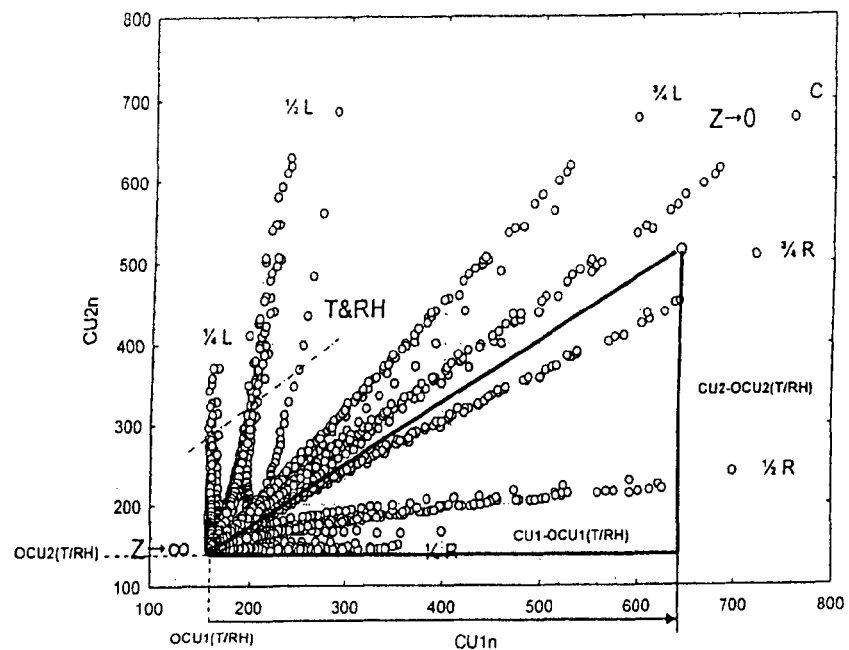
$$\sqrt{(CU1-OCU1(TRH))^2 + (CU2-OCU2(TRH))^2}$$
FIG_11
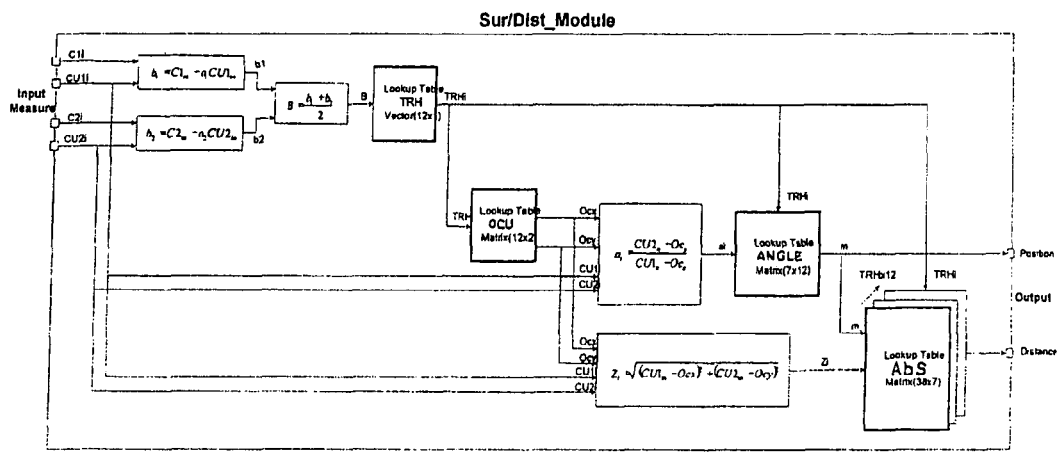

FIG_12
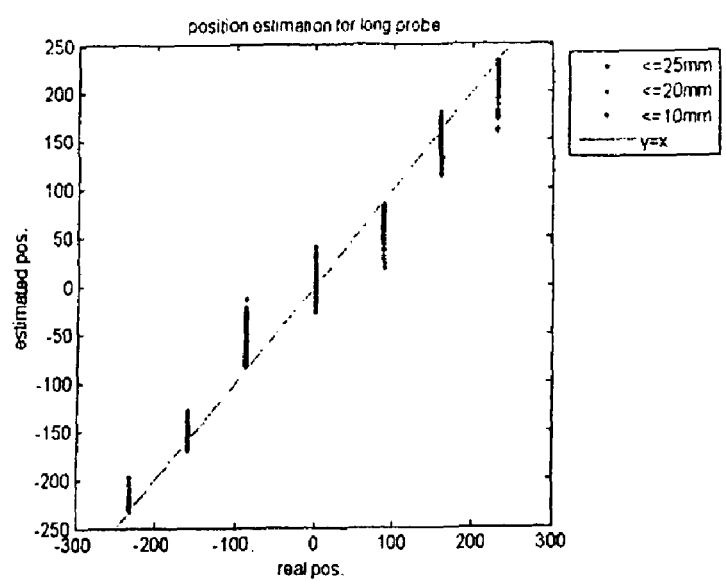
FIG_13
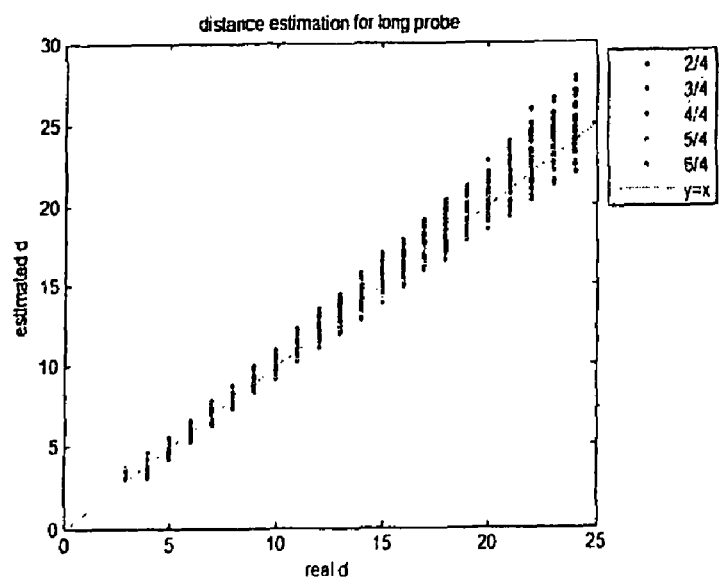

METHOD FOR IMPROVING THE LOCALISATION OF A TARGET IN REGARD OF A SENSOR

BACKGROUND OF THE INVENTION

1. Field of the Invention

The present invention relates to the technical field of sensors area.

More precisely, the present invention concerns a system and a method to determine the localisation of a target in regard of a sensor.

A non exclusive implementation of the present invention relates to an evaluation of a passenger seated in an automotive seat so as to control in consequence the airbag triggering.

2. Description of Related Art

The Applicant has filed on Jul. 28, 2005 a French patent application under number FR-0508072, which describes a technical structure of a capacitive sensor allowing detecting if the sensor is covered or not by a target.

BRIEF SUMMARY OF THE INVENTION

The aim of the present invention is now to improve this structure for allowing a more precise localisation of said target, which may be a passenger, in regard of the sensor.

A specific aim of the present invention is to propose a method which allows to eliminate the impact of temperature and/or humidity upon the detection. Indeed the inventors have determined that temperature and/or humidity have a great influence upon capacitive detection, particularly when applied to automotive car seats, and may lead to erroneous issues.

This aim is achieved according to the present invention with a method comprising the steps of collecting the outputs of a capacitive sensor comprising a plurality of electrodes and combining said outputs so as to obtain a signal representative of the distance separating a target from the sensor.

According to another preferential feature, the method of the present invention comprises also a step of combining the outputs of the sensor so as to determine the amount of the surface of the sensor covered by said target.

According to another preferential feature, the method of the present invention implements a capacitive sensor comprising at least two electrodes covering complementary respective areas of a sensed zone so as to form two balanced pixel sensors.

According to another preferential feature, the method of the present invention implements a capacitive sensor comprising three electrodes: two main electrodes covering complementary respective areas of a sensed zone and a third auxiliary electrode covering both said complementary respective areas.

According to another preferential feature, the method of the present invention implements a capacitive sensor wherein said third auxiliary electrode surrounds the two main electrodes.

According to another preferential feature, the method of the present invention comprises the steps of applying respective controlled electric potentials upon said electrodes and subsequently, after breaking said electrical potentials, measuring the electric charges upon at least one selected electrode so as to generate an electrical output.

According to another preferential feature, the method of the present invention implements a step of selecting a value representative of the distance separating the target from the sensor, from a look up table, using as input for this selection a combination of the outputs issued by the capacitive sensor.

According to another preferential feature, the method of the present invention implements a step of selecting a value representative of the amount of the surface of the sensor covered by said target, from a look up table, using as input for this selection a combination of the outputs issued by the capacitive sensor.

According to another preferential feature, the method of the present invention implements look up tables which contain values representative of the distance separating the target from the sensor and/or values representative of the amount of the surface of the sensor covered by said target, for a plurality of temperature and humidity values, and the method comprises the step of selecting in the look up tables an output value depending on a combination of the outputs issued by the capacitive sensor which represents real temperature and humidity.

The present invention also relates to a system for implementing the above method as well as a seat for automotive car comprising such a system.

BRIEF DESCRIPTION OF THE DRAWINGS

Other technical features, aims and advantages of the present invention will be understood from the following description which relates to the enclosed drawings wherein:

FIG. 1 illustrates a non limitative embodiment of a capacitive sensor according to the present invention, FIG. 2 illustrates an example of electrical potentials applied to the electrodes of said capacitive sensor during an initial step of a detecting prosecution in accordance with the present invention, FIG. 3 illustrates schematically the individual capacitive components operating in the sensor system of the present invention, FIG. 5 illustrates schematically the relative evolution of electrical outputs issued from the sensor in accordance with the present invention, which are used to determine parameters representative of the temperature and humidity, more precisely FIG. 5a illustrates curves CU1=f (C1), while FIG. 7 illustrates the construction of a look up table taking into account temperature and humidity parameters, more precisely FIG. 7a illustrates curves CU=f (C), FIG. 7b illustrates the definition of the origin of the curves and FIG. 7c illustrates the corresponding look up table, FIG. 8 illustrates the dependency of a relative evolution of electrical outputs issued from the sensor with the relative position of a reference target in regard of the sensor, more precisely FIG. 8a illustrates curves CU2=f (CU1) while FIG. 8b illustrates a sequence of relative displacements of the reference target in regard of the sensor, FIG. 9 illustrates the construction of a look up table determining an initial offset of curve responses in relation with temperature and humidity parameters, more precisely FIG. 9a illustrates some points of curves CU2=f (CU1) while FIG. 9b illustrates the corresponding look up table, FIG. 10 illustrates the determination of the distance separating a target from the sensor on the basis of the combination of outputs issued from the capacitive sensor, FIG. 11 illustrates schematically the complete detection method in accordance with the present invention, FIG. 12 illustrates the performance of the present invention in determining the amount of the surface of the sensor covered by said target, and FIG. 13 illustrates the performance of the present invention in determining the distance separating the target from the sensor.

DETAILED DESCRIPTION OF THE INVENTION

Figure 4:
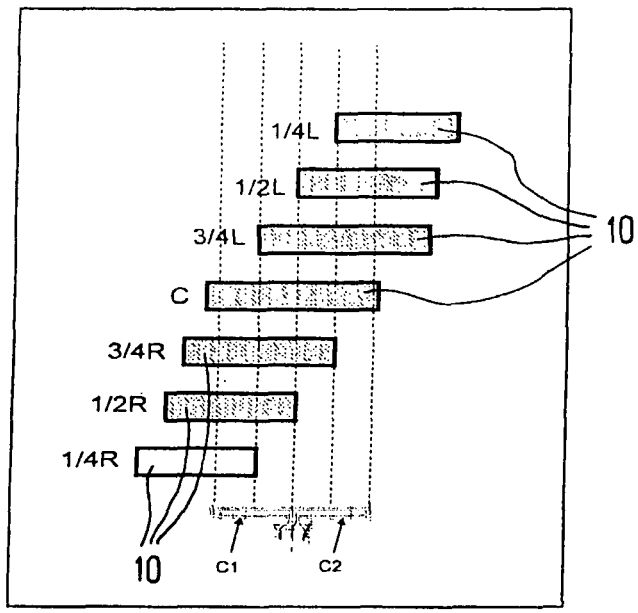
FIG. 4 illustrates schematically the stepped displacement of a referenced target in regard of the sensor during a preparation part of the present invention.

As indicated above, the present invention proposes a method for determining the distance separating a target 10 and a sensor 100 and the surface of the target 10 covering the sensor 100, which method includes means for compensating drifts caused by temperature and humidity environment.

The present invention applies particularly, but not restrictively, to the localisation and/or identification of a passenger on an automotive car to control in consequence airbag triggering.

The present invention uses a capacitive sensor structure 100.

This capacitive sensor 100 may be in conformity with a plurality of embodiments.

Preferentially the capacitive sensor 100 of the present invention comprises at least two electrodes 110, 120, in conformity with the disclosure of French patent application 05 08072, covering complementary respective areas of a sensed zone so as to form two balanced pixel sensors. The function of such two electrodes 110, 120 and corresponding balanced pixel sensors will be described more in detail in the following specification.

Preferentially the capacitive sensor 100 of the present invention comprises 3 electrodes 110, 120, 130 as illustrated on FIG. 1, in conformity with the general disclosure of French patent application 05 08072. Of course the present invention is not limited to the specific embodiment and shape illustrated on FIG. 1.

The two electrodes 110 and 120 correspond to main electrodes. They cover complementary respective areas of a detection or sensed zone. More precisely the two main electrodes 110 and 120 are preferentially made of rectilinear tracks. The two main electrodes 110 and 120 are preferentially aligned. Preferentially the two main electrodes 110 and 120 have the same surface. However the present invention may be implemented with main electrodes 110, 120 having non identical surfaces, taking into account the ratio between the respective surfaces of the two main electrodes 110 and 120 in the detecting prosecution.

The third auxiliary electrode covers at least substantially both the two complementary respective areas of the two main electrodes 110 and 120. More precisely as illustrated on FIG. 1, preferentially the third electrode 130 surrounds said two main electrodes 110 and 120.

The third electrode 130 is connected at its middle part to a transverse connecting track 132. Similarly the two main electrodes 110 and 120 are connected at their adjacent ends to transverse respective connecting tracks 112 and 122.

Such a sensor 100 comprising only 3 outputs 112, 122 and 132 may deliver a number of output information greater than 3, corresponding to capacitor values depending of the connection of said electrodes 110, 120 and 130. French patent application 0508072 for example discloses the implementation of 8 output information from similar electrodes 110, 120 and 130.

These capacitor values are measured by applying judiciously an electric controlled dc field between some electrodes 110, 120, 130 and subsequently measuring and counting up electric charges on dedicated electrodes 110, 120, 130, after breaking said electric dc field.

These electric charges can be converted in voltage for example but not restrictively by using the means according to arrangement defined in document WO-A-00/25098.

In other words preferentially the present invention method converts the electric charges accumulated on a selected electrode 110 or 120, into an electric output signal, with supplying means suitable to apply a controlled dc electrical voltage on selected electrodes, integrator means including a capacitive switching system and control means suitable to define cyclically, at a selected frequency, a sequence of two following steps:

a first step wherein the supplying means are connected to at least one electrode so as to apply an electric field on this electrode and to accumulate electric charges on this electrode, and a second step wherein the supplying means are not connected to the selected electrode, and this selected electrode is connected to the input of the integrator means to transfer the electrical charges into the integrator means.

More precisely although the disclosure of French patent application 0508072 recommends to use 8 combinations of measurements from a similar sensor, the present invention implements preferentially only 4 combinations of measurements upon the sensor. Indeed the inventors have uncovered that such 4 combinations are sufficient to localise precisely the target in view of the sensor. These 4 combinations which are schematically illustrated on FIG. 2 wherein Vf corresponds to an electric dc potential and G corresponds to ground (0 volt) potential, are listed here after:

(1) Phase C1 get with the following way:
Application of Vf on electrodes 110 and 120, and of G on electrode 130.
Removal Vf from electrodes 110 and 120 and G from electrode 130.
Put electrodes 110, 120 and 130 in high impedance state (totally left open) in order to keep all charges trapped in electrodes.
Count up the charges trapped on electrode 110. This result is called C1

(2) Phase CU1 get with the following way:
Application of Vf on electrodes 110, 120 and 130.
Removal Vf from electrodes 110, 120 and 130.
Put electrodes 110, 120 and 130 in high impedance state (totally left open) in order to keep all charges trapped in electrodes.
Count up the charges trapped on electrode 110. This result is called CU1.

(3) Phase C2 get with the following way:
Application of Vf on electrodes 110 and 120, and of G on electrode 130.
Removal Vf from electrodes 110 and 120 and G from electrode 130.
Put electrodes 110, 120 and 130 in high impedance state (totally left open) in order to keep all charges trapped in electrodes.
Count up the charges trapped on electrode 120. This result is called C2.

(4) Phase CU2 get with the following way:

Application of Vf on electrodes 110, 120 and 130.

Removal Vf from electrodes 110, 120 and 130.

Put electrodes 110, 120 and 130 in high impedance state (totally left open) in order to keep all charges trapped in electrodes.

Count up the charges trapped on electrode 120. This result is called CU2.

On FIG. 2 bold character identify the electrode where the charges are measured.

The complete sensor system is illustrated in the form of an electric equivalent scheme of individual capacitive components on FIG. 3, wherein $C_{BG}$ corresponds to the capacitive component between the ground (for example the chassis of a car) and a target 10 (for example a passenger seated on a seat of a car), $C_{1B}$, $C_{2B}$ and $C_{UB}$ correspond respectively to the capacitive component between the target 10 and the electrodes 110, 120 and 130, $C_{1G}$, $C_{2G}$ and $C_{UG}$ correspond respectively to the capacitive component between the ground and the electrodes 110, 120 and 130, and $C_{1U}$, $C_{12}$ and $C_{2U}$ correspond respectively to the capacitive component between the electrodes 110 and 130, between the electrodes 110 and 120, and between the electrodes 120 and 130.

Each of the 4 above combinations may be expressed as the summation of capacitive components composing the sensor system illustrated on FIG. 3:

$$C1 = C_{1U} + C_{1B} + C_{1G} \quad (1)$$

$$CU1 = C_{1B} + C_{1G} \quad (2)$$

$$C2 = C_{2U} + C_{2B} + C_{2G} \quad (3)$$

$$CU2 = C_{2B} + C_{2G} \quad (4)$$

The inventors, after a lot of searches and experiments, have uncovered that using and combining some relevant information issued from the above 4 combinations can successively:

1—Get information about drift caused by temperature and humidity,

2—From this information, compensate drift on data, and

3—From compensated data, determine, on reliable basis, surface of a target covering the sensor as well as the distance separating the sensor from the target.

More precisely the inventors have uncovered that in order to know the behaviour of these 4 phases versus surface occupation, distance, temperature and humidity variation, it is necessary to run a measurement campaign to characterize them.

For this, the inventors took a conductive reference target 10 having a length which is equal to the length of the sensor 100 (ie equal to the length of the electrode 130 and equal to the sum of the lengths of the two electrodes 110 and 120 as illustrated on FIG. 4).

The inventors successively displace step by step said reference target 10 in regard of the sensor 100, in parallel to the longitudinal direction of the sensor 100. Arbitrary the inventors take a resolution of ¼ of sensor length and m steps, with m=7 in the non limitative example, for this displacement and surface variation. But of course any other resolution and/or number m of steps must be taken.

The displacement starts arbitrary by left side and covers the sensor 100, on m successive steps, by incremental step of ¼ of surface.

On FIG. 4:

¼ L means ¼ of sensor length covered by left side.

½ L means ½ of sensor length covered by left side.

¾ L means ¾ of sensor length covered by left side.

C (for "center") means the target covers totally the sensor 100.

¾ R means ¾ of sensor length covered by right side.

½ R means ½ of sensor length covered by right side.

¼ R means ¼ of sensor length covered by right side.

Moreover at each step of the m steps of this relative displacement, the inventors move the reference target 10 progressively away the sensor 100, step by step, from a distance Z of 0 mm (contact) to 100 mm (considered as infinite distance). Arbitrary in a non limitative example, the inventors displaced the target 10 from the sensor 100 by a number n=38 steps, from 0 mm to 100 mm.

And for each step of relative covering surface (m steps) and distance (n steps), the inventors change temperature and humidity. Arbitrary the inventors combined o=4 different values of temperature (25° C., 40° C., 55° C. and 70° C.) with p=3 different values of humidity (RH=50%, 70% and 95%) leading to o·p=4×3=12 combinations of temperature and humidity.

All the responses corresponding to the 4 identified phases (C1, CU1, C2 and CU2) are recorded for each of the m=7 relative positions illustrated on FIG. 4, that for each of n=38 respective distances Z, and all that for each of o×p=12 combinations of values of temperature and humidity.

The inventors have determined that the 4 phases C1, CU1, C2 and CU2 lead to 3 typical combinations.

First is CU1=f(C1).

Second is CU2=f(C2).

Third is CU1=f(CU2).

Figure 5A:
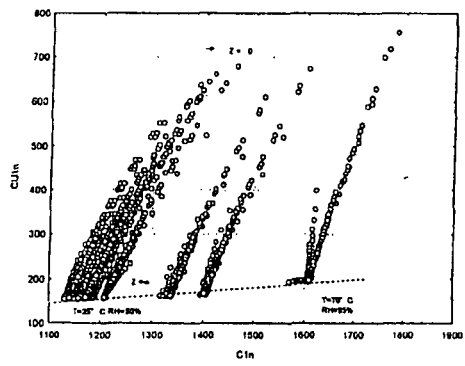
Figure 5B:
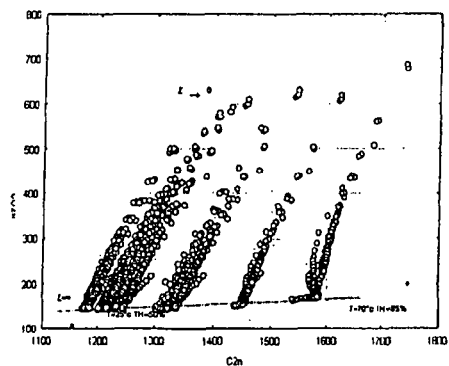
FIG. 5b illustrates curves CU2=f (C2)

Considering CU1=f(C1) (pixel 1) and CU2=f(C2) (pixel 2) (see FIG. 5) the inventors noticed that the slopes $$a_1 = \Delta CU1/\Delta C1$$

$$a_2 = \Delta CU2/\Delta C2$$

are practically constant, whatever sensor surface covered, distance, temperature and humidity are.

However the origin of each curves CUo for distance approaching the infinite is moving on, ie depends, with temperature and humidity.

This observation of the inventors leads to a standout characteristic since the above 4 phases allow to obtain information about temperature (T°c) and humidity (RH %) couple: (T°c, RH %)=f(CUo)

This characteristic may be explained with the phase ratio $CU1/C1 = (C_{1B} + C_{1G})/(C_{1U} + C_{1B} + C_{1G})$.

The same terms are present at numerator and denominator, except that denominator includes further term $C_{1U}$ which represents the local capacitor between electrodes 110 and 130 which is sensitive at temperature and humidity (dependence of dielectric constant of support of the electrodes with temperature and humidity)

The same characteristic applies for pixel 2, since $$CU2/C2 = (C_{2B} + C_{2G})/(C_{2U} + C_{2B} + C_{2G}).$$

Figure 6:
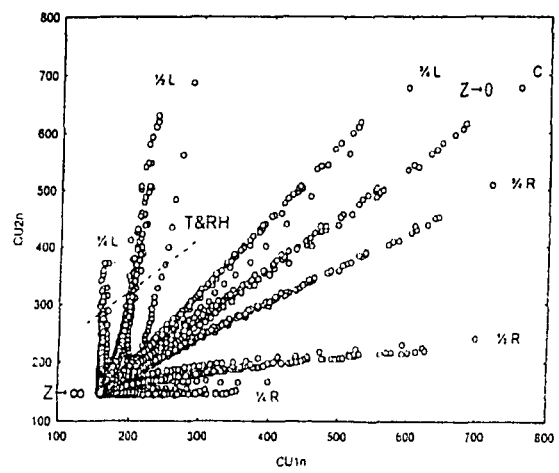
FIG. 6 illustrates schematically the relative evolution of other electrical outputs issued from the sensor in accordance with the present invention, which are used to determine the distance separating the target from the sensor and/or the amount of the surface of the sensor covered by said target.

Now considering CU2=f(CU1) (see FIG. 6) the inventors noticed:

the angle α of CU2 versus CU1 is function of the surface of the sensor 100 covered by the reference target 10 (here step of resolution is ¼ of sensor length) whatever distance, temperature and humidity are, the origin O of curves CU2 and CU1 are slightly depending of temperature and humidity, but the inventors determined that such offset can be compensated by means of information coming from CU1=f(C1) and CU2=f(C2), the position of a point P in plan CU2=f(CU1) is function of distance Z from target 10 to sensor 100.

This characteristic can be explained with the phase ratio CU2/CU1 since $$CU2/CU1=(C_{2B}+C_{2G})/(C_{1B}+C_{1G}).$$

When no target 10 is in front of the sensor 100 (distance=infinite) slightly the same terms are at numerator and denominator of CU2/CU1:

$$C_{2G}\#C_{1G}$$

$$C_{1B}=C_{2B}=0$$

In case a target 10 partially covers the sensor 100, $C_{1B}$ is different from $C_{2B}$ because these capacitors depend on the surface of the target 10 covering each pixel electrode 110 or 120. These two capacitors measure the unbalanced surface covering pixel 110 and pixel 120.

The inventors have uncovered that these 3 outstanding characteristics can:
compensate sensor drift caused by temperature and humidity,
calculate surface occupied by a target facing the sensor 100, and
calculate distance between sensor 100 and a target.

More precisely on the basis of the above established facts, the inventors propose a method which is split in 2 parts: a "Preparation" part and a "Detection" part. These two parts will be described more in detail now.

1. Preparation Part

This preparation part is divided in 3 main steps: 1) the generation of a Temperature and Humidity Look Up Table "LookTRH", 2) the generation of 3 Look Up Tables corresponding to the Angle ("LookAngle") and the Origins (OCU1,OCU2) of curves Cu=f(C) ("LookOCU1" and "LookOCU2") and 3) the generation of a Distance Look Up Table ("Lookabs").

11—Step 1: Temperature and Humidity Look Up Table generation "LookTRH".

The aim of this Table is to give a correspondence between real capacitive measures and the temperature and humidity parameters so as to compensate drift due to the temperature and humidity.

Construction of this Table may be operated according to various process. A specific one of such process will be described as step 1 in regard of the illustration of FIG. 7.

From the 2 curves:

$$CU1=f(C1)$$

$$CU2=f(C2)$$

The 2 following slopes are calculated $$\alpha 1 = \frac{\Delta C1}{\Delta CU1}$$

$$\alpha 2 = \frac{\Delta C2}{\Delta CU2}$$

After that interception of the 2 curves with abscissa, B1 and B2, is calculated.

writing $CU1=\alpha_1 C1+\beta_1$, abscissa $B1=\beta 1/\alpha 1$ writing $CU2=\alpha_2 C2+\beta_2$, abscissa $B2=\beta 1/\alpha 2$ The average $B=(B1+B2)/2$ of the two calculated abscissa is determined. Then for each oxp couple of temperature and humidity, a Look Up Table of $B=(B1+B2)/2$ is constructed as illustrated on FIG. 7. With oxp combinations of temperature and humidity, the Look Up Table LookTRH has of course oxp inputs. In other words the shape of the LookTRH Table is oxp versus 2, ie an output B for each one the oxp inputs.

Of course the specific table illustrated on FIG. 7 is only an example and may not be considered as limitative.

12—Step 2: Angle and OCU1, OCU2 Look Up Tables generation (see FIG. 8)

The aim of Angle Look Up Table is to give a correspondence between a real capacitive measure or combination of real capacitive measures and the amount of target surface covering a sensor, for a plurality of temperature and humidity parameters.

Construction of this Table may be operated according to various process. A specific one of such process will be described in regard of the illustration of FIG. 8.

To construct the Angle Look Up Table "lookAngle", the angle $\Delta m=\Delta CU2/\Delta CU1$ is calculated from the curves $CU2=f(CU1)$ illustrated on FIG. 8a, for each oxp couple of temperature and humidity of Look Up Table "LookTRH" and for each of the m relative positions between the reference target 10 and the sensor 100 illustrated on FIG. 8b. FIG. 8b illustrates m=7 relative positions, varying from one to the other of ¼ of the length of the reference target 10. With oxp combinations of temperature and humidity and m relative positions, the Look Up Table LookAngle has oxpxm inputs. In other words the shape of the LookAngle Table is oxpxm versus 2, ie an output Δm for each one the oxpxm inputs. In practice such Look Up Table may be divided for example into oxp elementary Look Up Table having each m inputs.

Of course the invention is not limited to this specific embodiment.

Then the inventors propose to construct two Tables LookOCU1 and LookOCU2 to give a correspondence between the abscissa and ordinate origins of the curves CU1 and CU2, with a plurality of temperature and humidity parameters.

Construction of this Table may be operated according to various process. A specific one of such process will be described in regard of the illustration of FIG. 9.

More precisely the inventors propose a) to calculate and trace a line CU2=f (CU1) for m=C (for all oxp points of T/RH), b) to calculate and trace for each m a line for all oxp points of T/RH and c) to calculate the intersection of slope C and all other line m for all oxp points of T/RH.

Then for each index T/RH, the point position averages of the abscissa origin OCU1 and the ordinate origin OCU2 of the curves CU2=f (CU1) (see FIG. 9) are stored in two Look Up Tables called "LookOCU1", "LookOCU2", as illustrated on FIG. 9b.

With oxp combinations of temperature and humidity, the Look Up Tables LookOCU1 and LookOCU2 have oxp inputs. In other words the shape of the LookOCU1 and LookOCU2 Tables is oxp versus 2, ie an output "average of origin OCU1 or OCU2" for each one the oxp inputs.

13—Step 3: Distance Look Up Table Generation Lookabs

The aim of this Table is to give a correspondence between a real capacitive measure or a combination of capacitive measures and the distance separating a target from a capacitive sensor.

Construction of this Table may be operated according to various process. A specific one of such process will be described as step 3 in regard of the illustration of FIG. 10.

This process involves a calculation on the basis of a theorem known as Pythagore theorem.

The inventors propose to calculate the distance separating the target 10 from the sensor 100 on the basis of a trigonometric function involving the values CU1 and CU2 corrected by specific abscissa origin OCU1 (TRH) and ordinate origin OCU2 (TRH).

Considering CU2=f(CU1) and the previous Look Up Tables "LookTRH", "Look Angle", "LookOCU1" and "LookOCU2", a value $$ABS = \sqrt{(CU1 - OCU1(TRH))^2 + (CU2 - OCU2(TRH))^2}$$

is calculated for each surface position m (1 to 7 in the specific case illustrated on the drawings), for each couple of T/RH (12 in the above described case) which define the origins OCU1 and OCU2 and for each distance (38 in a specific and not limitative case).

The value ABS corresponds to the distance between the target 10 and the sensor 100.

All the values calculated for ABS are stored in a Look Up Table called "LookAbs".

With o×p combinations of temperature and humidity, m steps of relative displacement and n step of distances, the Look Up Table Lookabs has o×p×m×n inputs. In other words the shape of the Lookabs Table is o×p×m×n versus 2, ie an output ABS for each one the o×p×m×n inputs. In practice such Look Up Table may be divided for example into o×p elementary Look Up Table having each m×n inputs.

In summary the preparation part leads to construction of 5 Look Up Tables: "LookTRH", "LookAngle", "LookOCU1", "LookOCU2", "LookAbs" and 2 characteristics parameters: $\alpha 1$, $\alpha 2$ (slope of curves CU1=f(C1) and CU2=f(C2)).

With these 5 Look Up Tables and the two characteristic parameters $\alpha 1$, $\alpha 2$, the surface of the target 10 covering the sensor 100 and the distance separating the target 10 and the sensor 100 may be calculated in "real time" during the "detection part".

2—Detection Part

This detection part is divided in 4 main steps: 1) the calculation of an index pointer for "LookTRH", 2) the calculation of OCU1 and OCU2 origins, 3) the calculation of position m, and the calculation of the angle which give an information about surface occupation and 4) the calculation of distance between target 10 and sensor 100.

21—Step 1: Calculation of index pointer for "LookTRH"

Signals CU1, C1, CU2, C2 are acquired on sensor 100 in real time.

From the two relationships CU1=f(C1) and CU2=f(C2), the $\alpha_1$, $\alpha_2$, interception abscissa and then the corresponding index pointer (B1+B2)/2 are calculated. With this index (straight or by interpolation) the T/RH couple information are pulled out from Look Up Table "LookTRH".

22—Step 2: Calculation of OCU1 and OCU2 origins.

With the previous T/RH couple information, the origins OCU1 and OCU2 for curve CU2=f(CU1) are pulled out from Look Up Tables "LookOCU1", "LookOCU2" (straight or by linear interpolation).

23—Step 3: Calculation of position m, and calculation of the angle which give surface occupation The slope a=(CU2−OCU2)/(CU1−OCU1) is calculated and from this calculated slope a, as well as from the T/RH couple information obtained at step 1, a value representative of position is pulled out from Look Up Table "LookAngle". This value is representative of surface occupation by a target 10, such as a passenger, in front of sensor 100.

24—STEP 4 : Calcualtion of distance between target and sensor.

A value $D = \sqrt{(CU1n - OCU1(TRH))^2 + (CU2n - OCU2(TRH))^2}$ is calculated.

Then on the basis of this value D, as well as from the T/RH couple information obtained at step 1 and the angle value obtained at step 3, an estimated distance is pulled out from Look Up Table "LookAbs" (straight or by linear interpolation).

In summarize from data acquisition CU1, C1, CU2, C2 the method in accordance with the present invention allows to determine to calculate surface occupation by a target 10 placed in front of sensor 100 and its distance from said sensor 100.

The complete detection method in accordance with the present invention is illustrated on FIG. 11.

Results got by the inventors by implementation of this method, for variation of surface in all temperature and humidity range, are displayed in FIG. 12. On this FIG. 12, Y axis corresponds to the estimated surface (calculated) while the X or abscissa axis corresponds to the real surface.

Distances calculated up to one inch on the basis of these results are displayed in FIG. 13.

FIGS. 12 and 13 show that the present invention offer a reliable determination both of the distance separating a target 10 from a sensor 100 and the surface of the target 10 covering the sensor 100.

Particularly the present invention allows to compensate the drifts caused by temperature and humidity.

Of course the present invention is not limited to the above specification which is given only for illustration. The present invention includes any alternative in conformity with the enclosed claims.

What is claimed is:

1. A method to locate a target (10) in regard of a capacitive sensor (100), comprising the steps of:
   collecting the outputs of the capacitive sensor (100), said capacitive sensor including a plurality of electrodes (110, 120, 130), and
   combining said outputs so as to obtain a signal representative of the distance separating said target (10) from the sensor (100) and to determine the amount of the surface of the sensor (100) covered by said target (10),
   said method further comprising a preparation method and a detection method,
   wherein said preparation method comprises the steps of:
   i) generating a first correspondence between an abscissa output signal of the capacitive sensor depending on temperature and humidity wherein there are o temperature values and p humidity values and o times p (o×p) temperature and humidity value combinations, and
   ii) generating for each one of said o×p combinations of o temperature values and p humidity values, a second correspondence between a real capacitive measure and the amount of target surface covering the sensor and a third correspondence between said real capacitive measure and the distance separating the target from said sensor, and
   wherein said detection method comprises the steps of:

i) evaluating the real temperature and the real humidity on the basis of a measured abscissa output signal issued from the capacitive sensor and said first correspondence, ii) selecting said third correspondence on the basis of the real temperature and the real humidity evaluated at step i) and evaluating the distance separating said target and said sensor on the basis of a real capacitive measure issued from the sensor and on the basis of said selected third correspondence, and iii) selecting said second correspondence on the basis of the real temperature and the real humidity evaluated at step i) and evaluating the amount of the surface of the sensor covered by said target on the basis of said real capacitive measure issued from the sensor and on the basis of said selected second correspondence, wherein a processor executing programmed instructions is used to perform said steps.

2. The method of claim 1, wherein at least two of said electrodes of said capacitive sensor (100) cover complementary respective areas of a sensed zone so as to form two balanced pixel sensors.

3. The method of claim 1, wherein said electrodes of said capacitive sensor (100) comprise two main electrodes (110, 120) covering complementary respective areas of a sensed zone and a third auxiliary electrode (130) covering both said complementary respective areas.

4. The method of claim 3, characterized in that said third auxiliary electrode (130) surrounds the two main electrodes (110, 120).

5. The method of claim 1, characterized in that the method comprises the steps of applying respective controlled electric potentials upon two main electrodes and a third auxiliary electrode (110, 120, 130) of said capacitive sensor (100) and subsequently, after breaking said electrical potentials, measuring the electric charges upon at least one selected among said three electrodes (110, 120, 130) so as to generate an electrical output.

6. The method of claim 1, characterized in that the method implements 4 combinations of successive measures on three electrodes (110, 120, 130) of said capacitive sensor (100), wherein Vf corresponding to an electric dc potential and G corresponding to ground (0volt) potential, said 4 combinations are operated as follows:

(1) application of Vf on two main electrodes (110, 120), and of G on an auxiliary electrode (130),
remove Vf from main electrodes (110, 120) and G from auxiliary electrode (130),
put all electrodes (110, 120, 130) in high impedance state in order to keep all charges trapped in electrodes,
count up the charges trapped on a first main electrode (110), (2) application of Vf on all electrodes (110, 120, 130),
remove Vf from electrodes (110, 120, 130),
put all electrodes (110, 120, 130) in high impedance state in order to keep all charges trapped in electrodes,
count up the charges trapped on said first main electrode (110), (3) application of Vf on said two main electrodes (110, 120), and of G on said auxiliary electrode (130),
remove Vf from main electrodes (110, 120) and G from auxiliary electrode (130),
put all electrodes (110, 120, 130) in high impedance state in order to keep all charges trapped in electrodes,
count up the charges trapped on second main electrode (120), (4) application of Vf on all electrodes (110, 120, 130),
remove Vf from electrodes (110, 120, 130),
put all electrodes (110, 120, 130) in high impedance state in order to keep all charges trapped in electrodes,
count up the charges trapped on said second main electrode (120).

7. The method of claim 1, characterized in that the method implements a step of selecting a value representative of the distance separating the target (10) from the sensor (100), from a look up table (Lookabs), using as input for this selection a combination of the outputs issued by the capacitive sensor (100).

8. The method of claim 1, characterized in that the method implements a step of selecting a value representative of the amount of the surface of the sensor (100) covered by said target (10), from a look up table (LookAngle), using as input for this selection a combination of the outputs issued by the capacitive sensor (100).

9. The method of claim 1, characterized in that the method implements look up tables (Lookabs, LookAngle) which contain values representative of the distance separating the target (10) from the sensor (100) and/or values representative of the amount of the surface of the sensor (100) covered by said target (10), for a plurality of temperature and humidity values, and the method comprises the step of selecting in the look up tables (Lookabs, LookAngle) an output value depending on a combination of the outputs issued by the capacitive sensor (100) which represents real temperature and humidity.

10. The method of claim 1, characterized in that said method implements a set of Look Up Tables (LookTRH, LookAngle, LookOCU1, LookOCU2, Lookabs,) preestablished during a preparation part.

11. The method of claim 1, characterized in that said method implements a Look Up Table (LookTRH) to give a correspondence between real capacitive measures and the temperature and humidity parameters so as to compensate for drift due to the temperature and humidity.

12. The method of claim 11, characterized in that said Look Up Table (LookTRH) is constructed on the basis of the following steps:

calculating and storing $(B1+B2)/2=f(T,RH)$ from measure phases $CU1=f(C1)$ and $CU2=f(C2)$, for o×p couples of temperature and humidity, with writing $CU1=\alpha_1 C1+\beta_1$ so that $B1=\beta_1/\alpha_1$ and writing $CU2=\alpha_1 C2+\beta_2$ so that $B2=\beta1/\alpha 2$.

13. The method of claim 11, characterized in that said Look Up Table (LookTRH) contains a correspondence between o×p inputs (B) and o×p couples of combinations of o temperature values and p humidity values.

14. The method of claim 1, characterized in that said method implements a Look Up Table (LookAngle) to give a correspondence between a real capacitive measure or combination of real capacitive measures and the amount of target surface covering a sensor (100), for a plurality of temperature and humidity parameters.

15. The method of claim 14, characterized in that said Look Up Table (LookAngle) is constructed on the basis of the following steps:

from a curve $CU2=f(CU1)$, for each couple of temperature and humidity parameters and for each of a plurality of m relative superposing positions of a target (10) and a sensor (100) varying step by step, the angle $\Delta m=\Delta CU2/\Delta CU1$ is calculated and stored.

16. The method of claim 15, characterized in that the relative superposing positions vary from one to the other from steps corresponding to 1/x, typically ¼, of sensor length.

17. The method of claim 14, characterized in that said Look Up Table (LookAngle) contains a correspondence between o×p×m inputs (a) and o×p×m combinations of o temperature values, p humidity values and m superposing positions values.

18. The method of claim 1, characterized in that said method implements two Look Up Tables (LookOCU1, LookOCU2) to give a correspondence between the abscissa and ordinate origins of curves (CU1,CU2), with a plurality of temperature and humidity parameters.

19. The method of claim 18, characterized in that said Look Up Tables (LookOCU1, LookOCU2) are constructed on the basis of the following steps:
calculating and storing the average point position of the abscissa origin (OCU1) and the ordinate origin (OCU2) of curves CU2=f(CU1) for a plurality of temperature and humidity combinations (T/RH).

20. The method of claim 18, characterized in that said Look Up Tables (LookOCU1, LookOCU2) contain each a correspondence between o×p inputs corresponding to couples of combinations of o temperature values and p humidity values and o×p outputs corresponding to origin values.

21. The method of claim 1, characterized in that said method implements a Look Up Table (Lookabs) to give a correspondence between a real capacitive measure or a combination of capacitive measures and the distance separating a target (10) from a capacitive sensor (100).

22. The method of claim 21, characterized in that said Look Up Table (LookAbs) is constructed on the basis of the following steps:
calculating and storing a distance on the basis of a trigonometric function involving measured values (CU1, CU2) corrected by specific abscissa origin (OCU1 (TRH)) and ordinate origin (OCU2 (TRH)).

23. The method of claim 21, characterized in that said Look Up Table (LookAbs) is constructed on the basis of the following steps:
calculating and storing a distance separating the target (10) from the sensor (100) on the basis of a function $$ABS = \sqrt{(CU1n - OCU1(TRH))^2 + (CU2n - OCU2(TRH))^2}$$

Wherein CU1n and CU2n correspond to measured value, and
OCU1 (TRH) and OCU2 (TRH) correspond to abscissa origin and ordinate origin of the measured value curve
for each of a plurality m of surface relative surperposing position, for each couple of a plurality o×p of combination of temperature and humidity (T/RH) and for each of a plurality n of distance separating the target (10) and the sensor (100).

24. The method of claim 21, characterized in that said Look Up Table (Lookabs) contains a correspondence between o×p×m×n calculated inputs corresponding to combinations of o temperature values, p humidity values, m relative superposing position values and n relative distance parameters and o×p×m×n outputs corresponding to estimated distance values.

25. The method of claim 1, characterized in that said detection method comprises the steps of determining the surface of the capacitive sensor (100) covered by the target (10) with the following steps:
from measured curves CU1=f(C1) and CU2=f(C2 ) and with 2 characteristics parameters α1, α2 corresponding to slopes of these curves, calculating interception abscissa and then an average index (B1+B2)/2,
pulling out from a Look Up Table (LookTRH) on the basis of this average index, a T/RH value corresponding to a parameter temperature and humidity,
from this T/RH value, picking up in Look Up Tables (LookOCU1, LookOCU2) the abscissa origin (OCU1) and the ordinate origin (OCU2) for curve CU1=f(CU2),
from the curve CU1=f(CU2) calculating a point position on the basis of the slope a=(CU2-OCU2)/(CU1-OCU1),
pulling out a surface occupation value in front of sensor, on the basis of the a calculated value, from a Look Up Table (LookAngle).

26. The method of claim 25, characterized in that the final step of pulling out a surface occupation value in front of the sensor, on the basis of the a calculated value, from a Look Up Table (LookAngle) further implements as input for the Look Up Table (LookAngle), the parameter representative of temperature and humidity.

27. The method of claim 1, characterized in that said detection method conprises the steps of determining the distance separating the capacitive sensor (100) and the target (10) with the following steps:
from measured curves CU1=f(C1) and CU2=f(C2) and with 2 characteristics parameters α1, α2 corresponding to slopes of these curves, calculating interception abscissa and then an average index (B1+B2)/2,
pulling out from a Look Up Table (LookTRH) on the basis of this average index, a T/RH value corresponding to a parameter temperature and humidity,
from this T/RH value, picking up in Look Up Tables (LookOCU1, LookOCU2) the abscissa origin (OCU1) and the ordinate origin (OCU2) for curve CU1=f(CU2),
calculating a distance parameter on the basis of a trigonometric function $$\sqrt{(CU1n - OCU1(TRH))^2 + (CU2n - OCU2(TRH))^2},$$

involving measured values as well as the abscissa origin (OCU1) and the ordinate origin (OCU2) for curve CU1=f(CU2), and
pulling out a distance value separating a target (10) from the sensor (100), on the basis of the D calculated value, from a Look Up Table (LookAbs).

28. The method of claim 27, characterized in that the final step of pulling out a distance value, on the basis of the calculated D value, from the Look Up Table (Lookabs) further implements as input for the Look Up Table (Lookabs), the parameter representative of temperature and humidity.

29. The method of claim 27, characterized in that the final step of pulling out a distance value, on the basis of the a calculated D value, from a Look Up Table (Lookabs) further implements as input for the Look Up Table (Lookabs), a parameter representative of the amount of surface of a target (10) in front of the sensor (100).

30. A system to locate a target (10) in regard of a capacitive sensor (100), comprising:
means for collecting the outputs of the capacitive sensor (100), said capacitive sensor including a plurality of electrodes (110, 120, 130); and
means for combining said outputs so as to obtain a signal representative of the distance separating said target (10) from the sensor (100),
wherein said means for combining also determines the amount of the surface of the sensor (100) covered by said target (10), said system further comprising a preparation module and a detection module, wherein said preparation module includes:

i) means for generating a first correspondence between an abscissa output signal of the capacitive sensor depending on temperature and humidity wherein there are o temperature values and p humidity values and o times p (o×p) temperature and humidity value combinations, and ii) means for generating for each one of said o×p combinations of o temperature values and p humidity values, a second correspondence between a real capacitive measure and the amount of target surface covering the sensor and a third correspondence between said real capacitive measure and the distance separating the target from said sensor, and wherein said detection module includes:

i) means for evaluating the real temperature and the real humidity on the basis of a measured abscissa output signal issued from the capacitive sensor and said first correspondence, ii) means for selecting said third correspondence on the basis of the real temperature and the real humidity evaluated by said means for evaluating and evaluating the distance separating said target and said sensor on the basis of a real capacitive measure issued from the sensor and on the basis of said selected third correspondence, and iii) means for selecting said second correspondence on the basis of the real temperature and the real humidity evaluated by said means for evaluating and evaluating the amount of the surface of the sensor covered by said target on the basis of said real capacitive measure issued from the sensor and on the basis of said selected second correspondence.

31. Seat for an automotive car which includes a system to locate a target (10) in regard of a capacitive sensor (100), said system comprising:

means for collecting the outputs of the capacitive sensor (100), said capacitive sensor including a plurality of electrodes (110, 120, 130); and means for combining said outputs so as to obtain a signal representative of the distance separating said target (10) from the sensor (100), wherein said means for combining also determines the amount of the surface of the sensor (100) covered by said target (10), said system further comprising a preparation module and a detection module, wherein said preparation module includes:

i) means for generating a first correspondence between an abscissa output signal of the capacitive sensor depending on temperature and humidity wherein there are o temperature values and p humidity values and o times p (o×p) temperature and humidity value combinations, and ii) means for generating for each one of said o×p combinations of o temperature values and p humidity values, a second correspondence between a real capacitive measure and the amount of target surface covering the sensor and a third correspondence between said real capacitive measure and the distance separating the target from said sensor, and wherein said detection module includes:

i) means for evaluating the real temperature and the real humidity on the basis of a measured abscissa output signal issued from the capacitive sensor and said first correspondence, ii) means for selecting said third correspondence on the basis of the real temperature and the real humidity evaluated by said means for evaluating and evaluating the distance separating said target and said sensor on the basis of a real capacitive measure issued from the sensor and on the basis of said selected third correspondence; and iii) means for selecting said second correspondence on the basis of the real temperature and the real humidity evaluated by said means for evaluating and evaluating the amount of the surface of the sensor covered by said target on the basis of said real capacitive measure issued from the sensor and on the basis of said selected second correspondence.

* * * * *